United States Patent [19]

Borcea et al.

[11] Patent Number: 4,667,998
[45] Date of Patent: May 26, 1987

[54] ELECTROMAGNETIC GRIPPER ASSEMBLY

[75] Inventors: Nicky Borcea, Weston; Alexandru D. Ionescu, Easton; Mihai S. Barbulescu, Huntington, all of Conn.

[73] Assignee: Robohand, Inc, Easton, Conn.

[21] Appl. No.: 871,256

[22] Filed: Jun. 6, 1986

[51] Int. Cl.$^4$ ............................ B66C 1/42; B66C 1/06
[52] U.S. Cl. ........................................ 294/88; 294/116; 901/31
[58] Field of Search ............... 294/88, 95, 97, 106, 294/115, 116; 269/34, 218, 233, 234; 414/789, 753; 901/31, 36, 37, 38, 39, 40

[56] References Cited
U.S. PATENT DOCUMENTS

| | | | |
|---|---|---|---|
| 3,471,194 | 10/1969 | Martin et al. | 294/88 |
| 4,234,223 | 11/1980 | O'Neil | 294/88 |
| 4,320,914 | 3/1982 | Simon | 294/88 |

Primary Examiner—James B. Marbert
Attorney, Agent, or Firm—Arthur T. Fattibene

[57] ABSTRACT

An electromagnetic gripper assembly formed of a housing having an electromagnetic coil and armature reciprocally mounted thereon. A pair of gripper members are pivotally connected to the armature which is normally spring biased. The respective gripper members have a finger portion and a connected rocker lever portion, the latter having overlapping end portions by which they are pivotally connected to the armature to be actuated thereby as the electromagnetic coil is energized.

7 Claims, 7 Drawing Figures

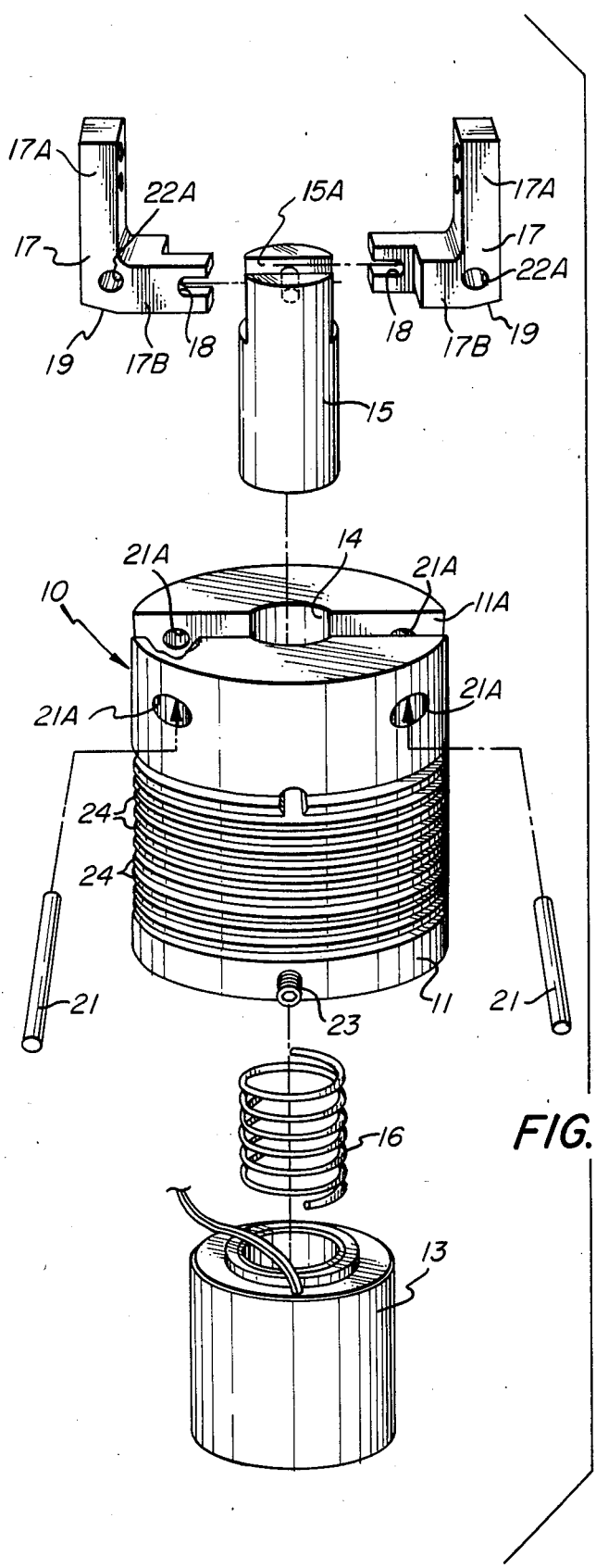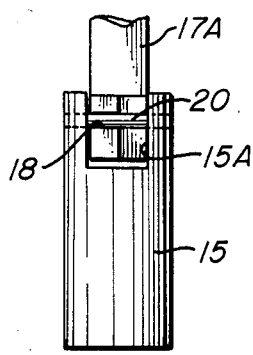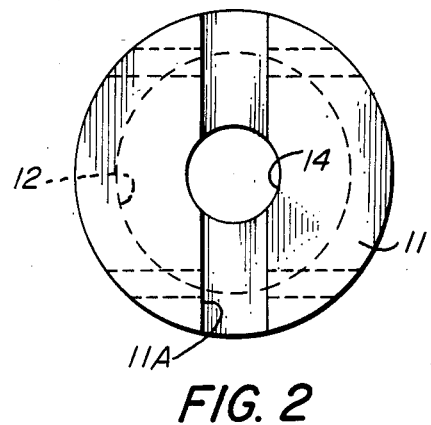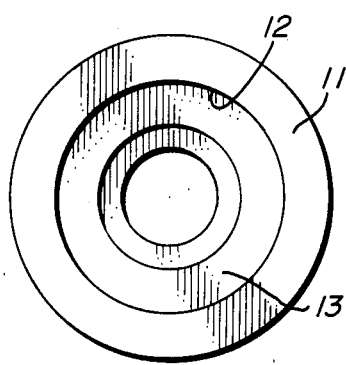
FIG. 1
FIG. 2
FIG. 3
FIG. 4

ELECTROMAGNETIC GRIPPER ASSEMBLY

FIELD OF INVENTION

This disclosure is directed to an electromagnetic gripper assembly adapted to define an end effector for gripping and releasing a work piece on command.

OBJECTS

Numerous gripper assemblies have been constructed and used for various applications and with various devices. An object of this invention is to provide for a relatively simple and easily manufactured gripper assembly which is positive in operation.

Another object is to provide an electromagnetically actuated gripper assembly which can be remotely actuated.

Another object is to provide an electromagnetically actuated gripper assembly having a novel jaw assembly.

Another object is to provide an electromagnetically actuated gripper assembly which can be readily assembled and disassembled with a maximum of ease and a minimum of effort.

SUMMARY OF THE INVENTION

The foregoing objects and other features of the invention are readily attained by a gripper assembly which includes a housing for accommodating an electromagnetic coil and an associated armature. A spring is provided for normally biasing the armature toward an inoperative position. The housing is provided with a transversely extending groove formed in one end thereof in which a pair of gripping jaw members are respectively pivotally connected to the housing within the groove. The respective jaw members include a projecting finger portion and a connected angularly disposed rocker lever portion which is disposed within the groove. The respective free end of the rocker lever portions are disposed in overlapping relationship and each being provided with a slot by which the respective jaw member is pivotally connected to the end of the armature. The arrangement is such that the actuation of the armature upon the energizing of the coil causes the finger portion to pivot between an operative gripping position and an inoperative non-gripping position. The housing may be provided with external fins for cooling purposes.

FEATURES

A feature of this invention resides in the provision of a simplified electromagnetic gripper having angularly shaped gripper members operatively connected to an armature of an electromagnetc coil by which the assembly can be readily assembled and disassembled.

Another feature resides in the provision of a gripper assembly requiring a minimum of component parts.

Other features and advantages will become more readily apparent when considered in view of the drawings and detail description wherein:

FIG. 1 is a perspective exploded view of an electromagnetic gripper assembly embodying the invention.

FIG. 2 is a detail top view of the gripper housing.

FIG. 3 is a bottom view of the housing assembly.

FIG. 4 is a detail view of the armature pin connection.

DETAIL DESCRIPTION

Figure 5:
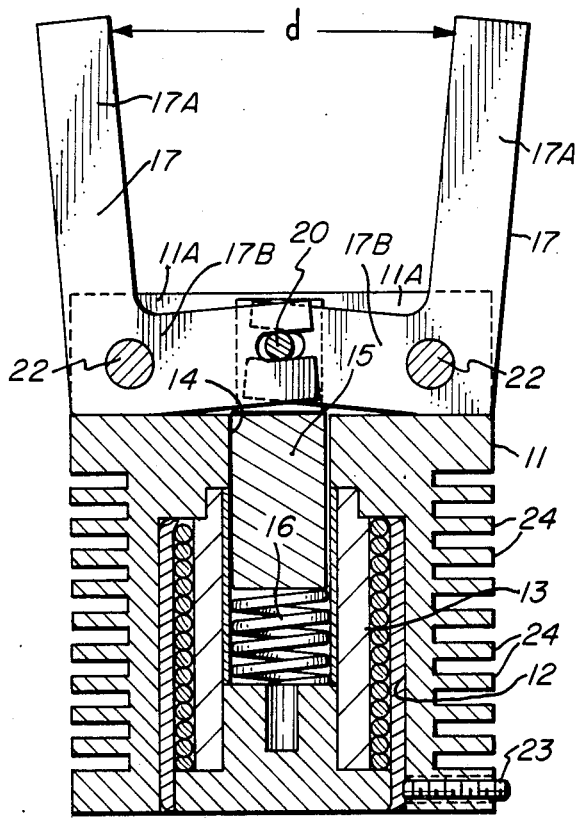
FIG. 5 is a sectional side view of the gripper assembly showing the parts in a normal de-energized state.
Figure 6:
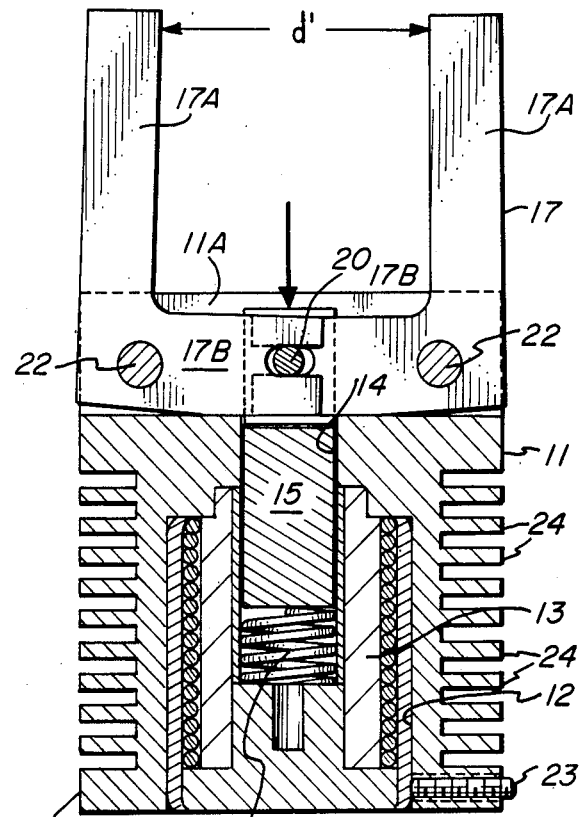
FIG. 6 is a view similar to FIG. 5, but showing the parts in the operative or energized state.

Referring to the drawings, there is illustrated in FIG. 1 an exploded view of the component parts making up an electromagnetic gripper assembly 10 embodying the invention. The gripper assembly 10 includes a housing 11 which is formed with a chamber 12, which is sized so as to receive an electromagnetic coil 13. It will be understood that the coil 13 includes a winding which is suitably connected into an electrical circuit by which the coil 13 is energized and de-energized. The housing 11 is also provided with a central bore 14 in which an armature 15 is reciprocally mounted. As best seen in FIGS. 5 and 6, the lower end of the armature extends into the coil 13 so as to subject it to the magnetic field when the coil 13 is energized. In the embodiment of FIGS. 1 to 6 a spring 16 is disposed in the well of the coil 13 for normally exerting a spring bias on the end of the armature 15.

As best seen in FIG. 1, the upper portion of the housing 10 is provided with a transversely extending groove 11A and through which the bore 14 extends. The upper end of the armature 15 is bifurcated at 15A to provide a means by which the gripper means are connected as will be described.

The gripper means comprise a pair of jaw members 17 and 17, which are similar in construction. As shown, each jaw member 17, 17 includes a projecting finger portion 17A and an angularly offset rocking lever portion 17B. The respective free ends of the rocking lever portions are formed with an open ended slot 18. In the assembled position, the respective free or slotted ends of the rocking lever portion 17B are disposed in overlying relationship so that the respective slots 18 are disposed opposite one another. The outer bottom edge of the respective lever portions 17B are provided with a radius as indicated at 19 so as to permit the gripper member to attain a limited rocking movement when actuated. The respective free ends of the gripper or jaw members 17, 17 are connected to the armature 15 by a pin 20.

As shown in FIGS. 5 and 6, the lower edge of the respective rocking lever portion 17B is sealed on the bottom of the groove 11A, and the respective gripper jaws or members 17, 17 are pivotally connected within the groove 11A by pivot pins 22, 22 respectively. Referring to FIG. 1, it will be noted that the pivot pins 22, 22 extend through aligned openings 21A, 21A and transversely of the groove 11A. Each of the respective gripper or jaw members is provided with a pivot pin apperture or hole 22A at the juncture of the finger and lever portion through which the pivot pins 22 extend. Thus, the respective gripper or jaw members 17, 17 are arranged to pivot about the pivot pins 22, 22 when actuated.

In the illustrated embodiment, the coil 13 is readily fitted into the chamber 12 formed in the housing by insertion from the bottom of the housing, and secured in place by a set screw or pin 23. The external surface of the housing 11 is provided with a series of spaced circumscribing fins 24 for cooling.

With the construction described, the arrangement is such that in the normal inoperative position, as shown in FIG. 5, the finger portions 17A, 17A are spread apart a distance "d"; the bias of the spring 16 normally exerting upward force on the bottom of the armature 15. When the electromagnetic coil 13 is energized, the developed magnetic field forces the armature downwardly against the bias of spring 16 as seen in FIG. 6, causing the gripper or jaw members to pivot about their respective pivot pins 22, 22 causing the finger portions 17A, 17A to close to a distance "d¹". As long as the coil 13 remains energized, the fingers 17A, 17A will remain closed onto a work piece (not shown), which is sized between "d" and "d¹". When the coil is de-energized, the force of the spring 16 acting on the armature will return the armature and associated gripper members 17, 17 to their normal inoperative position.

Figure 7:
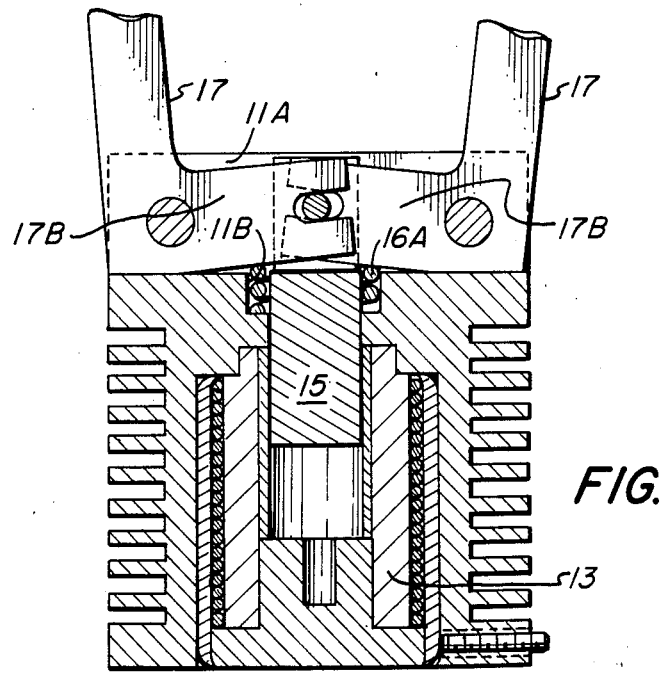
FIG. 7 is a sectional view of a modified gripper assembly.

FIG. 7 illustrates a slightly modified embodiment of the invention. In this form of the invention, the spring 16A is disposed within the groove 11A which is provided with a counter bore 11B to define a seat for the coil spring 16A. The upper end of the spring 16A bears against the lever portion 17B of the respective gripper members 17, 17. In all other respects, the construction of the embodiment disclosed in FIG. 7 is similar to that described with respect FIGS. 1 to 6.

From the foregoing, it will be apparent that the electromagnetic gripper assembly is relatively simple in construction, and which is arranged so that it can be readily assembled and/or disassembled quickly and simply. The respective gripper members 17, 17 can be readily separated from the armature simply by the removal of the pivot pins 22, 22, as is apparent in FIG. 1, and whereupon the armature can be readily lifted out of the housing. Releasing the set screw 23 permits the disassembly of the coil 13 and spring 16 from the housing. The reverse procedure allows for simple assembly.

While the invention has been described with respect to different embodiments, variations and modifications may be made without departing from the spirit or scope of the invention.

What is claimed is:

1. An electromagnetic gripper assembly comprising:
   means defining a housing,
   an electromagnetic coil disposed within said housing,
   an armature extending within the field of said coil,
   a pair of gripping jaw members.
   means for pivotally connecting each of said jaw members to said housing means.
   and means for connecting the respective jaw members to said armature whereby the actuation of said armature by energizing said coil effects the pivoting of said jaw members between operative and inoperative positions.
   and spring means for normally biasing said armature and connected jaw members toward an inoperative position.

2. An electromagnetic gripper assembly as defined in claim 1 wherein said housing means comprises block having an internal bore extending therethrough,
   said bore defining an enlarged chamber for receiving said coil,
   means for securing said coil in said chamber,
   and said housing having a plurality of circumscribing external cooling fins.

3. An electromagnetic gripper assembly as defined in claim 1 and said housing means having a transversely extending groove formed at one end thereof,
   said gripper jaw member disposed within said groove.

4. An electromagnetic gripper assembly as defined in claim 1, wherein each gripping jaw member comprises a finger portion and a connected angularly disposed rocking lever portion,
   said rocking lever portions of said jaw members having their respective free ends disposed in overlapping relationship,
   and each of said free ends having a slot formed therein, said respective slots oppositely disposed in alignment with one another,
   said armature having a pivot pin extending transversely of said aligned slot to define a pin and slot connection.

5. An electromagnetic gripper assembly as defined in claim 4, wherein said pivoting means comprises a pin for pivotally connecting each of said jaw members to said housing means within said groove,
   said pin being disposed at the juncture of said finger and rocking lever portion.

6. An electromagnetic gripper assembly comprising:
   a housing having a chamber formed in one end thereof,
   a bore disposed in alignment with said chamber and extending to the other end of said housing,
   said housing having a transversely extending groove disposed in communication with said bore.
   an electromagnetic coil disposed in said chamber.
   means for securing said coil in said chamber,
   an armature reciprocally mounted in said bore and said coil,
   said armature having a bifurcated end portion disposed within said groove,
   a pair of gripper members,
   each of said gripper members including a projecting finger portion and an angularly disposed rocker lever portion,
   said rocker lever portion of said gripper members being disposed in said groove,
   said respective rocker lever portions having their respective free ends disposed in overlapping relationship.
   a slot formed in the free ends of each of said rocker lever portions,
   said slot end being disposed in alignment.
   and said slotted free ends of said lever portions being reserved in the bifurcated end portion of said armature,
   a pin for connecting the respective free ends of said lever portions to said armature,
   a pivot pin for pivotally connecting each of said gripper members within said groove, whereby said finger portions of said gripper are pivoted between operative and inoperative position by the actuation of said armature, and
   a spring means for normally biasing said armature.

7. An electromagnetic gripper assembly as defined in claim 6, and
   including a plurality of external cooling fins circumscribing said housing.

* * * * *